G. L. PREBLE.
INSOLE.
APPLICATION FILED SEPT. 21, 1916.
1,340,404.
Patented May 18, 1920.
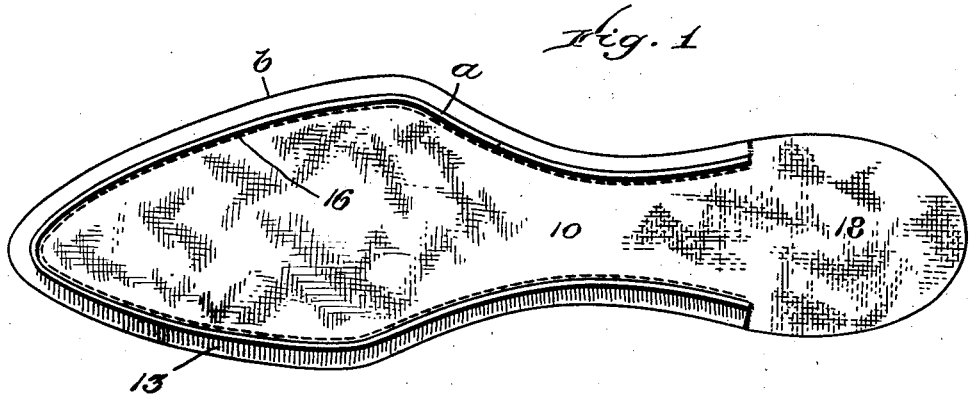
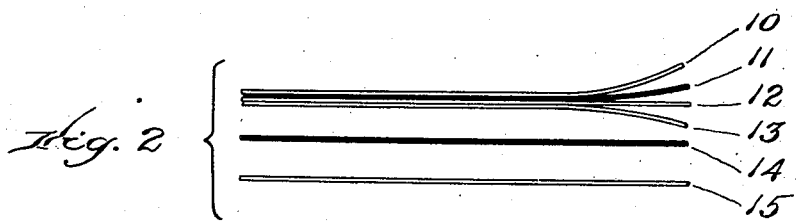
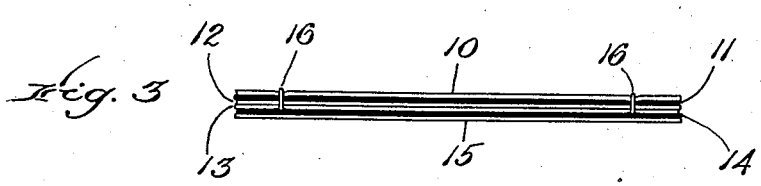
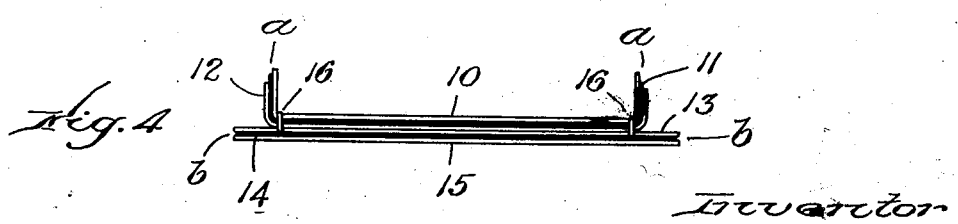
Inventor
George L. Preble
by Wright Brown Quinby May
Attorneys

UNITED STATES PATENT OFFICE.

GEORGE L. PREBLE, OF LYNN, MASSACHUSETTS.

INSOLE.

1,340,404.

Specification of Letters Patent. Patented May 18, 1920.

Application filed September 21, 1916. Serial No. 121,406.

*To all whom it may concern:*

Be it known that I, GEORGE L. PREBLE, a citizen of the United States, residing at Lynn, in the county of Essex and State of Massachusetts, have invented new and useful Improvements in Insoles, of which the following is a specification.

The object of the present invention is to provide an improved built-up insole. By the term "built-up" I mean a structure comprising a plurality of layers of suitable material fastened to each other, as distinguished from an insole made of a single piece of leather.

An insole requires at least three layers of fibrous sheet material and one layer of moisture-proof adhesive substance, in order to embody the fundamental principle of this invention, but for the best results I prefer to use four layers of fibrous sheet material and two layers of moisture-proof adhesive substance. In the first example above mentioned there would be an inseam-stitch-receiving layer, such as cloth, a protective layer such as cloth, a stiffening layer of adhesive moisture-proof substance such as pyroxylin, and a facing or tread layer of thin leather. The two layers of cloth would be connected by fasteners such as stitches, but the latter would not extend to the facing or tread layer. In the second example above mentioned there would be another inseam-stitch-receiving layer and another stiffening layer of moisture-proof adhesive substance, and the latter would be between and would unite the two inseam-stitch-receiving layers, primarily to strengthen the stitch-receiving flange and to cause it to stand up in position to receive the inseam-sewing needle.

The protective layer above mentioned has a protecting function in relation to the only or primary inseam-stitch-receiving layer, as the case may be, for it prevents the marginal portion of the latter from being stuck to the facing or tread layer by the adhesive substance that lies between them. The advantage of such protection is that the said marginal portion may be turned up to form a stitch-receiving flange without having to overcome the adhesion of the adhesive substance last mentioned.

One advantage of the invention is that an insole having a thin leather facing or tread layer has the appearance, when incorporated into a shoe, of an all-leather insole, but is less expensive than the latter, and fully as strong. It is superior to an all-leather insole in that it does not stretch, and excludes moisture from the foot. Crimping of material is minimized.

Of the accompanying drawings, which illustrate the present invention:

Figure 1 represents a face view of that side of an insole from which the stitch-receiving flange projects.

Fig. 2 represents, conventionally, an edge view of six layers of material that are used in the preferred form of insole, the two layers of adhesive substance being represented by solid black, and the layers of cloth and leather being represented by double lines.

Fig. 3 represents a cross-sectional view of an incompletely formed insole having all the elements included in Fig. 2, with the addition of stitches uniting some of the layers.

Fig. 4 represents a cross-sectional view through a completely formed insole provided with a stitch-receiving flange and marginal feather, in accordance with Fig. 1.

The same reference characters indicate the same parts wherever they occur.

The elements that I prefer are as follows:—an inseam-stitch-receiving layer 10 of relatively strong woven fabric, such as canvas, a reinforcing layer 11 of moisture-proof adhesive substance such as pyroxylin, an inseam-stitch-receiving layer 12 of relatively thin woven fabric such as drill, a protective layer 13 of woven fabric, a layer 14 of adhesive substance such as layer 11, and a facing or tread layer 15 of leather. The first four said layers are arranged in a group, as shown by Fig. 2, because they are united by a row of fasteners, such as stitches 16, before layers 14 and 15 are applied thereto. Layers 10, 11 and 12 may be united by the intermediate layer 11 and sold to the trade in relatively large sheets or rolled strips, and cut up as desired. In such case the manufacturer of insoles would preferably assemble all the layers in large sheets, and die out all the blanks for one insole at one stroke. Then he would attach the layer 13 to layers 10, 11 and 12 by inserting the stitches or other fasteners as at 16. The blanks 14 and 15, however, would be left unattached until after the latter operation had been performed. Layers 14 and 15 would then be assembled with the other layers, but the layer 14 would be rendered soft and tacky by applying a solvent, such as alcohol, to it, immediately prior to assembling the layers as shown by Fig. 3. Thus the whole number of layers would become united, layers 10 and 12 having already been united by the intermediate layer 11 of adhesive material, layer 13 having been united to the first three layers by stitches, and layer 15 being united to layer 13 by intermediate layer 14 of adhesive substance.

The marginal portion of layer 12 remains free from the feather portion of the insole, so far as adhesion is concerned. This is due to the presence of the protective layer 13 between layers 12 and 14. Hence in separating and turning up the marginal portions of layers 10, 11 and 12 to form the stitch-receiving flange, there is not the difficulty that would occur if the layer 12 were held by adhesion of layer 14.

After the several layers have been united as shown by Fig. 3, the marginal portion of layers 10, 11 and 12 as defined by the row of fasteners 16 may be turned up as shown by Fig. 4, thus providing a stitch-receiving flange $a$ to receive the usual inseam-stitches. The marginal portion of layers 13, 14 and 15 remains in a flat condition to provide the usual feather $b$. It will be noted that flange $a$ includes one of the layers of pyroxylin and that the feather $b$ includes the other, and that the rib and feather are thus amply stiffened. Inasmuch as pyroxylin possesses a considerable degree of resilience it will always tend to return to the position in which it has last set. For this reason the marginal portion of layer 11 should be softened prior to being turned up, so that the three layers that are turned up will be enabled to creep one with relation to another, and in order to eliminate the original set of the pyroxylin and substitute the set shown by Fig. 4. Such softening of layer 11 may be caused by steaming the entire insole, by moving a hot tool along the marginal portion thereof or by applying solvent to the marginal portion. The stitch-receiving flange will remain turned up, provided the turning-up operation is performed before layer 11 sets.

Referring to Fig. 1, the fasteners 16 extend to points approximately coincidental with the breast line of the heel but are omitted from the heel-seat portion 18. The heel-seat portion is therefore capable of being divided in a plane between the layer 13 and the inseam-stitch-receiving layer or layers, for at this portion of the insole there is no direct connection, by adhesion or otherwise, between the layers that provide the feather $b$ and the layer or layers that provide the inseam-stitch-receiving flange. Both groups of layers extend to the heel end of the insole. For convenience of description the heel-seat portion of the insole may be said to comprise two separable flaps, one of which includes layers 13, 14 and 15, and the other of which would include layers 10, 11 and 12 of the preferred form and the layer 17 of the simpler form.

I may avail myself of the separability of the layers of the heel-seat portion to practice a new method of lasting the heel end of a shoe. A thin steel plate having a contour conforming to the heel-seat portion may be inserted between layers 12 and 13 in the one case or between layers 13 and 17 in the other case. Such plate would be inserted prior to driving the lasting tacks that are used to fasten the pulled-over portion of the upper, around the heel seat, to the insole. Tread or facing layer 15 would, of course, be next to the last, and the heel-seat lasting tacks and heel-attaching nails would be driven through layers 10, 11 and 12 or through layer 17, as the case may be, but on reaching the interposed steel plate their points would be turned back and clenched instead of passing through layers 13, 14 and 15. The three latter said layers would therefore remain without any direct connection with the upper around the heel seat, and would be free to be bent up away from the steel plate to permit the latter to be removed from the inside of the shoe. Such removal would, of course, take place after the last is removed from the shoe. Layers 13, 14 and 15 would spring back, after the removal of the steel plate, into contiguous relation with the layer 13 or layer 17, and would cover the clenched points of the tacks and nails. One advantage of such method of lasting the heel portion is that it dispenses with the necessity of the usual heel-seat lining that is put in to protect the heel and stocking of the wearer from the tacks and nails that are driven into the heel-seat portion of the insole. Another advantage is that the layers 13, 14 and 15 afford better protection than the usual heel-seat lining, and the tread surface of the insole has a smoother surface and neater appearance that one that is provided with a special piece for that purpose.

I do not claim herein the above-described method of using a steel plate, but I claim the structure of the insole that permits such use and that affords the advantages above stated.

I claim:

An insole comprising two sole shaped portions, the upper portion including two layers of woven fabric, a layer of pyroxylin intermediate said fabric layers, and a lower protective layer, all of said layers being connected along a line parallel to, but spaced from, the edges thereof, the marginal portion of said fabric layers on either side of the pyroxylin layer being bent upwardly along the line of connection to provide an in-seam receiving lip that is stiffened by the intermediate layer of pyroxylin, and a layer of pyroxylin uniting the protective layer and the lower sole shaped portion and forming part of the feather that projects beyond the connection between the layers of the upper portion.

In testimony whereof I have affixed my signature.

GEORGE L. PREBLE.